(12) United States Patent
Wegele

(10) Patent No.: US 6,561,937 B1
(45) Date of Patent: May 13, 2003

(54) POWER TRANSMISSION BELT

(75) Inventor: Brian Dean Wegele, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/624,937

(22) Filed: Jul. 25, 2000

Related U.S. Application Data

(60) Provisional application No. 60/150,871, filed on Aug. 26, 1999.

(51) Int. Cl.[7] .............................. F16G 5/08; F16G 1/06
(52) U.S. Cl. ...................................................... 474/263
(58) Field of Search ................................ 474/263, 238, 474/251, 252, 205, 262, 250, 267, 237, 268; 156/138, 279, 245, 274; 428/90, 310

(56) References Cited

U.S. PATENT DOCUMENTS

| | | | | |
|---|---|---|---|---|
| 3,190,137 A | * | 6/1965 | Adams, Jr. ................... | 474/238 |
| 3,961,115 A | | 6/1976 | Klein .......................... | 428/88 |
| 4,031,768 A | | 6/1977 | Henderson et al. ........... | 74/233 |
| 4,047,446 A | | 9/1977 | Speer .......................... | 74/234 |
| 4,062,093 A | | 12/1977 | Klein .............................. | 26/2 |
| 4,174,415 A | * | 11/1979 | Bethe .......................... | 428/90 |
| 4,209,483 A | | 6/1980 | Batchelar .................... | 264/159 |
| 4,244,234 A | | 1/1981 | Standley ..................... | 474/263 |
| 4,409,047 A | | 10/1983 | Brooks ....................... | 156/138 |
| 4,414,047 A | * | 11/1983 | Wetzel et al. ........... | 474/251 X |
| 4,504,258 A | | 3/1985 | Tanaka et al. .............. | 474/263 |
| 4,559,029 A | * | 12/1985 | Miranti, Jr. et al. ......... | 474/251 |
| 4,634,726 A | | 1/1987 | Martin ......................... | 524/34 |
| 4,702,729 A | * | 10/1987 | Tanaka et al. ........... | 474/251 X |
| 4,747,812 A | | 5/1988 | Matsuoka et al. ........... | 474/252 |
| 4,775,357 A | | 10/1988 | Wolfe .......................... | 474/205 |
| 4,798,566 A | | 1/1989 | Sedlacek ..................... | 474/238 |
| 4,892,510 A | | 1/1990 | Matsuoka et al. .......... | 474/252 |
| 4,956,036 A | | 9/1990 | Sedlacek ..................... | 156/137 |
| 5,120,281 A | | 6/1992 | Mishima et al. ............ | 474/263 |
| 5,127,886 A | | 7/1992 | Fujiwara et al. ............ | 474/263 |
| 5,209,705 A | | 5/1993 | Gregg ......................... | 474/204 |
| 5,334,107 A | * | 8/1994 | White, Jr. ................... | 474/251 |
| 5,413,538 A | | 5/1995 | Mishima .................... | 474/263 |
| 5,415,594 A | | 5/1995 | Kitahama ................... | 474/263 |
| 5,421,789 A | | 6/1995 | Gregg ......................... | 474/153 |
| 5,501,908 A | | 3/1996 | Shioyama et al. .......... | 428/395 |
| 5,904,630 A | | 5/1999 | Bertheller ................... | 474/263 |

FOREIGN PATENT DOCUMENTS

| | | |
|---|---|---|
| EP | 0328511 | 8/1989 |
| EP | 0662571 | 7/1995 |
| GB | 0868916 | 5/1961 |

* cited by examiner

*Primary Examiner*—Marcus Charles
(74) *Attorney, Agent, or Firm*—John D. DeLong; Bruce J. Hendricks

(57) ABSTRACT

An endless power transmission belt comprising
(a) a tension section;
(b) a compression section;
(c) a load-carrying section disposed between the tension section and cushion section; and
(d) at least one drive surface having a flocked fabric facing layer bonded to an outer surface of the belt.

20 Claims, 1 Drawing Sheet

POWER TRANSMISSION BELT

This application claims the benefit of U.S. Provisional Application No. 60/150,871 filed Aug. 26, 1999.

BACKGROUND OF THE INVENTION

Power transmission belts, such as V-ribbed belts, are normally wound around pulleys that are complementary to the inner surface of the belt. Power transmission is effected by making use of the frictional forces generated between the surfaces. To increase such frictional forces, particularly in wet conditions, it is known to embed short fibers in the elastomer of the drive surface in the compression section of the belt. Unfortunately, in the manufacture of rubber belts, a splice is created at the point where the two ends of the belt are joined. In those instances where the flock is embedded into the elastomer, the fibers have been observed to become lodged in the splice and contribute to undesirable cracking and premature failure of the belt. Therefore, there exists a need to obtain the advantages of improving the frictional properties of power transmission belts in the absence of embedding the fibers into the elastomeric drive surface of the belt.

SUMMARY OF THE INVENTION

The present invention relates to a power transmission belt that is characterized by a flocked fabric on the drive surface which increases the coefficient of friction.

BRIEF DESCRIPTION OF THE FIGURES

The accompanying FIGURE shows embodiments of this invention in which

DETAILED DESCRIPTION OF THE INVENTION

Figure 1:
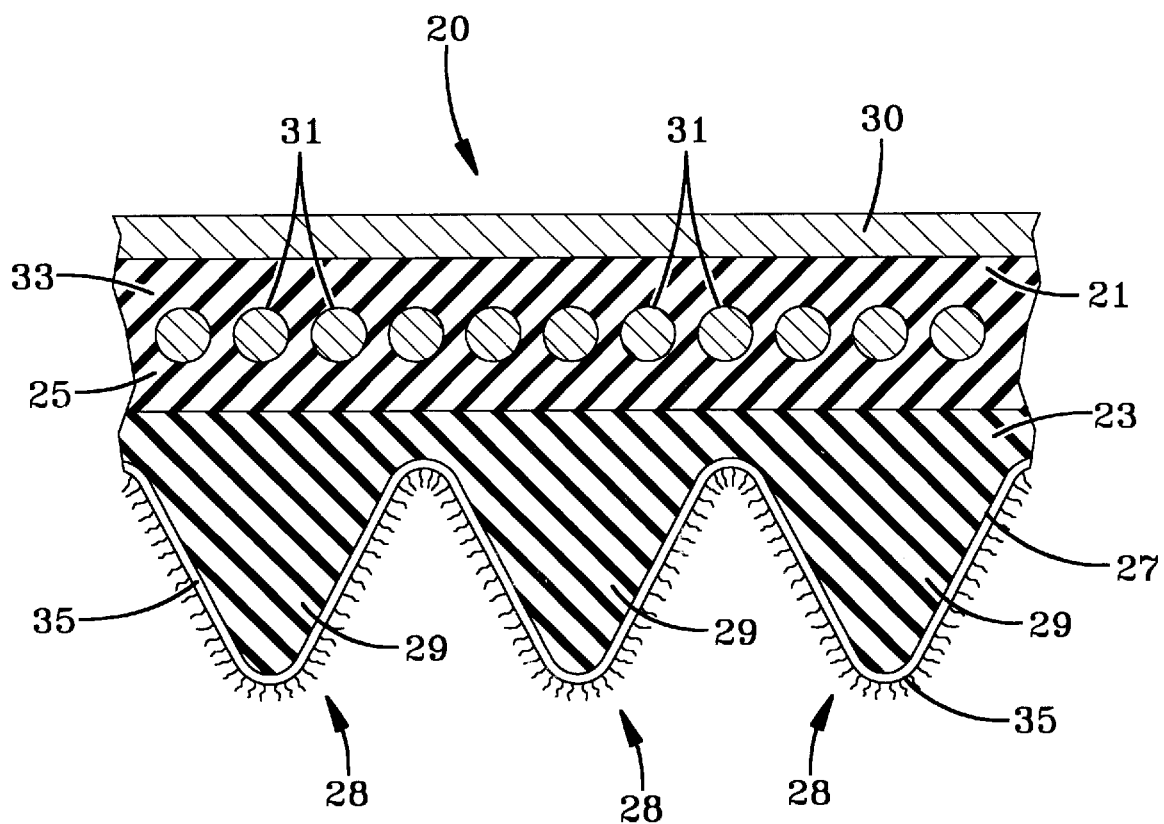
FIG. 1 is a fragmentary perspective view illustrating one embodiment of an endless power transmission belt of this invention.

There is disclosed an endless power transmission belt comprising (a) a tension section;

(b) a compression section;

(c) a load-carrying section disposed between said tension section and cushion section; and (d) at least one drive surface having a flocked fabric facing layer bonded to an outer surface of the belt.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a compression section 23 and a load-carrying section 25 disposed between the tension section 21 and compression section 23. The belt 20 also has an inside ply or inner fabric layer 27, adhered to a drive surface 28 and three ribs 29 or Vs which are fabric-coated. The belt 20 of FIG. 1 has a fabric backing 30.

The fabric backing 30 may be bidirectional, non-woven, woven or knitted fabric. The fabric backing layer 30 may be frictioned, dipped, spread, coated or laminated.

The fabric facing layer 27 may be made from a bidirectional, non-woven, woven or knitted fabric. The preferred fabric layer 27 is non-woven.

The fabrics to be flocked for use in the present invention are made of conventional materials including nylon (such as nylon 4,6, nylon 6,6 and nylon 6), polyester/rayon, cotton, cotton/rayon, polyester, cotton/polyester, nylon/polyester, cotton/nylon, Lycra™ (segmented polyurethane), aramid, rayon, and the like. Preferably, the fabric is made of polyester/rayon.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments and as discussed later, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be coated with the flocked fabric as described herein. Preferably, the belt 20 has one drive surface.

The rubber compositions for use in the tension section 21 and compression section 23 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers (HNBR), polyurethane, elastomers marketed under the Viton™ designation and ethylene-acrylic elastomers sold under the name VAMAC and blends thereof.

The surface of the fabric 27 on the drive surface is covered with a short fiber flock 35 by means of an adhesive to directly adhere the flock 35 to the fabric 27. The short fiber flock 35 for use in this invention is characterized by a length range of from 0.12 mm to 9.6 mm and a denier (grams per 9000 meters) of 0.5 to 50. Preferably, the length (measured in the longest direction) ranges from 0.25 to 6 mm and the denier ranges from 0.8 to 25. The most preferred flock has a length of from 0.5 mm to 3 mm and a denier of from 1 to 3. The short fiber flock 35 is uniformly distributed directly on the surface of the drive surface 28 of the power transmission belt 20. Unlike the prior art belts, the flock is not dispersed in the elastomer of the compression section 23 but rather the flock is separated from the elastomer in the compression section 23 by the fabric 27. The short fiber flock 35 may be derived from cotton, carbon fiber, rayon, acrylic, Teflon™ (polytetrafluoroethylene), nylon, polyester, aromatic polyamide (aramid), fiberglass and mixtures thereof. The flock 35 may be produced by means known to those skilled in the art, such as by reducing the length of a mass of already short fibers by cutting or grinding. The ground fibers are then graded by screening to eliminate overly long fibers.

There are many types of water- and solvent-based adhesives which may be used to adhere the flock to the surface of the fabric. The particular adhesive that may be used may vary. One conventional adhesive which may be used is known in the art as a RFL (resorcinol-formaldehyde-latex) adhesive. The RFL adhesives comprise a polymer latex which may be based on natural rubber, styrene-butadiene rubber, acrylonitrile-butadiene rubber (NBR), hydrogenated acrylonitrile-butadiene rubber (HNBR) and vinyl pyridine. An optional ingredient to the RFL is an isocyanate compound. Additional examples of conventional adhesives are the resin emulsions sold by BF Goodrich which include polyvinyl acetate, polyacrylic, polyvinyl chloride and polyurethane. Cement solutions (organic) of polymers may also be used as an adhesive. Representative polymers include natural rubber, polychloroprene, acrylonitrile-butadiene copolymers, polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers, polyurethane and ethylene-acrylic elastomers.

The adhesive is first applied to the fabric 27 and the flock 35 is thereafter applied. The adhesive may be applied to the fabric either before or after being adhered to the compression section 23 of the belt. Preferably, the adhesive and flock are first applied to the fabric 27 and thereafter the flock-treated fabric 27 is applied to the belt 20.

There are many methods available for applying flock adhesives. In roll-to-roll flocking, the adhesive may be applied with a knife, reverse roll or roll-over-platform coaters. Engraved rolls, spray applicators and rotary screen printers may also be used. Other flock adhesive application methods include silk-screen, dipping, brushing and spraying.

The thickness of the adhesive layer may vary. Generally speaking, the thickness of the adhesive may range from about 0.05 mm to 1 mm. Preferably, the thickness of the adhesive will range from 0.05 to 0.4 mm.

The short fiber flock 35 may be applied to the adhesive-treated fabric in a number of means and thereafter the flocked fabric applied to as uncured belt. The flock may be applied to the adhesive-coated surface either mechanically, electrostatically or by means of a combination of both techniques. Mechanical flocking can be further divided into windblown and beater-bar methods. Electrostatic flocking sometimes incorporates a pneumatic process to propel fibers toward a surface in a windstream. The beater bar method involves passage of the adhesive-treated fabric over a series of polygonal rollers that rapidly rotate to vibrate the substrate. The vibration is used to drive the fiber onto the adhesive. Fibers may be fed to the substrate by gravity from a flock module. Windblown mechanical flocking uses an airstream to deliver the flock to the adhesive-treated fabric. Electrostatic flocking is a known technique which utilizes a field of static electricity to orient fibers and promote their perpendicular alignment. This technique is recommended with longer fibers. In the electrostatic technique, the adhesive-coated substrate passes between the potentials of a high voltage electrostatic field. An electrode is utilized to give the flock a charge. The charged fibers become aligned with the electric field lines of force. The ground potential is formed by the substrate and/or the grounded parts of the machine. The flock is thus attracted to the adhesive where it becomes embedded. Via this method, most of the fibers adhering to the adhesive-coated surface are perpendicular to it. The windblown and electrostatic methods may be utilized simultaneously through pneumatic/electrostatic flocking. With this method, an airstream containing the fibers are directed through a nozzle. At the exit of the nozzle, a charge orients the fibers according to field lines.

The short fiber flock may be applied to the fabric of the belt in a variety of levels. For example, the amount of flock may range from 0.05 kg/m$^2$ to 1.0 kg/m$^2$. The preferred level ranges from about 0.1 kg/m$^2$ to 0.5 kg/m$^2$.

After the fiber flock has been applied, the flocked fabric may be cleaned by suction and the like. Thereafter, the adhesive is dried.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied followed by the flocked fabric. The assembled laminate or slab is then removed from the drum, placed in a mold, cured and cut into the belts in a manner known to those skilled in the art.

While present exemplary embodiments of this invention and methods of practicing the same have been illustrated and described, it will be recognized that this invention may be otherwise variously embodied and practiced within the scope of the following claims.

What is claimed is:

1. An endless power transmission belt comprising
   (a) a tension section;
   (b) a cushion section;
   (c) a load-carrying section disposed between said tension section and compression section; and
   (d) at least one drive surface having a flocked fabric facing layer bonded to an outer surface of the belt; wherein the flock on said fabric is directly adhered to said fabric by the use of an adhesive; and wherein the flock is not dispersed in an elastomer.

2. The power transmission belt of claim 1 wherein said fabric is selected from the group consisting of bidirectional, non-woven, woven and knitted fabric.

3. The power transmission belt of claim 2 wherein said fabric is non-woven.

4. The power transmission belt of claim 1 wherein the thickness of said adhesive ranges from 0.5 to 1 mm.

5. The power transmission belt of claim 1 wherein the flock on said fabric is selected from the group consisting of cotton, carbon fiber, rayon, acrylic, polytetrafluoroethylene, nylon, polyester, aromatic polyamide, fiberglass and mixtures thereof.

6. The power transmission belt of claim 1 wherein the length of the flock on said fabric ranges from 0.12 mm to 9.6 mm.

7. The power transmission belt of claim 6 wherein the length of the flock ranges from 0.25 mm to 6 mm.

8. The power transmission belt of claim 7 wherein the denier of the flock ranges from 0.8 to 25.

9. The power transmission belt of claim 8 wherein said fabric is polyester/rayon.

10. The power transmission belt of claim 1 wherein the denier of the flock on said fabric ranges from 0.5 to 50.

11. The power transmission belt of claim 1 wherein the fabric that is flocked is made of a material selected from the group consisting of nylon, polyester/rayon, cotton, cotton/rayon, polyester, cotton/polyester, nylon/polyester, cotton/nylon, segmented polyurethane, aramid and rayon.

12. The power transmission belt of claim 1 wherein said fiber flock is present on said fabric in an amount ranging from 0.05 to 1.0 kg/m$^2$.

13. The power transmission belt of claim 12 wherein said fiber flock is present on said fabric in an amount ranging from 0.1 to 0.5 kg/m$^2$.

14. The power transmission belt of claim 1 having one driving surface.

15. The power transmission belt of claim 1 wherein the drive surface of the belt is selected from the group consisting of flat, single V-grooved, multi-V-grooved and synchronous.

16. The power transmission belt of claim 1 wherein the drive surface of the belt is multi-V-grooved.

17. The power transmission belt of claim 1 wherein said fabric is non-woven fabric.

18. An endless power transmission belt comprising (a) a tension section;

(b) a cushion section;

(c) a load-carrying section disposed between said tension section and compression section; and (d) at least one drive surface having a flocked fabric facing layer bonded thereto; wherein the flock is not dispersed in an elastomer.

19. The endless power transmission belt of claim 18, wherein the flock is uniformly distributed directly on the drive surface.

20. An endless power transmission belt comprising (a) a tension section;

(b) a cushion section comprising an elastomer;

(c) a load-carrying section disposed between said tension section and compression section; and (d) at least one drive surface having a flocked fabric facing layer bonded thereto; wherein the flock is not dispersed in an elastomer, and the flock is separated from the elastomer in the compression section by the fabric.

* * * * *